United States Patent [19]

Rose

[11] 4,371,961
[45] Feb. 1, 1983

[54] CAPACITIVE INFORMATION SYSTEM
[75] Inventor: Gerald D. Rose, Indianapolis, Ind.
[73] Assignee: RCA Corporation, New York, N.Y.
[21] Appl. No.: 208,983
[22] Filed: Nov. 21, 1980
[51] Int. Cl.[3] ............................................. G11B 11/06
[52] U.S. Cl. ..................................... 369/126; 369/151
[58] Field of Search .................. 369/126, 151, 55, 53, 369/170, 173; 358/128.5, 342, 340, 343; 324/60 R, 60 C

[56] References Cited

U.S. PATENT DOCUMENTS

| | | | |
|---|---|---|---|
| 3,842,194 | 10/1974 | Clemens | 369/126 |
| 3,930,117 | 12/1975 | Clemens | 369/151 |
| 3,943,276 | 3/1976 | Knitter | 369/126 |
| 4,162,510 | 7/1979 | Keizer | 369/151 |
| 4,273,967 | 6/1981 | Wada | 369/43 |
| 4,296,371 | 10/1981 | Keizer | 369/55 |

Primary Examiner—Alan Faber
Attorney, Agent, or Firm—Birgit E. Morris; Joseph D. Lazar

[57] ABSTRACT

An improved information storage and recovery system comprising a playback stylus, having a dielectric support element and a conductive electrode, and a grooved conductive disc record in which information is recorded. The information is recovered on playback while there is relative motion between the record surface and the stylus by sensing capacitive variations between the stylus conductive electrode and the record surface. The improvement comprises employing that angle between the electrode face and the record surface such that the respective paths of dielectric effects between the electrode face and the record surface both in the direction of relative motion and in the direction opposite the direction of relative motion are balanced.

7 Claims, 2 Drawing Figures

CAPACITIVE INFORMATION SYSTEM

This invention relates to a capacitive disc information recovery system. More particularly this invention relates to a video disc playback stylus in which the electrode face is not perpendicular to the disc surface.

BACKGROUND OF THE INVENTION

U.S. Pat. No. 3,842,194 of Clemens discloses a video disc having a playback system utilizing variable capacitance. In one configuration of the Clemens system, information representative of the recorded picture and sound is encoded in the form of a relief pattern in a relatively fine spiral groove on the surface of a disc record. For example, groove widths about 2.6 micrometers and groove depths of about 0.5 micrometer may be used. The disc is coated with a lubricant layer. During playback a pickup stylus about 2.0 micrometers wide having a thin conductive electrode thereon, for example about 0.2 micrometer thick, engages the groove of the record as it is rotated by a supportive turntable. Capacitive variations between the stylus electrode and the record surface are sensed to recover the pre-recorded information.

Keizer, in U.S. Pat. No. 4,162,510, discloses a novel keel tipped pickup stylus structure. The keel tipped pickup stylus comprises a dielectric support element having a body, a constricted terminal portion and shoulders interconnecting the body with the constricted terminal portion. The electrode surface is remote from the prow end of the stylus.

The styli of Clemens and Keizer employ an electrode substantially perpendicular to the record disc surface. Problems have been encountered with these styli caused by the interference of low frequency signals associated with the audio signal with the video signal. This low frequency interference, called sound-beat interference, causes the picture quality to degrade and the picture to break up.

One method of overcoming this problem is disclosed in Clemens et al., U.S. Pat. No. 3,930,117. In the Clemens et al. patent, the metal electrode layer is overcoated with a dielectric layer. The overcoated dielectric layer serves to balance the fringing capacitance dielectric paths of the dielectric support element. It is believed that the imbalance between the path through the dielectric support element and the path through the air contributes to sound-beat interference.

In the copending application of Mindel, Video Disc Playback Stylus, Ser. No. 68,505, filed Aug. 22, 1979, abandoned on or about Mar. 20, 1981, the sound-beat problem is also addressed. Mindel oxidizes the outer portion of the metal conductive electrode layer. The oxidized metal layer serves to balance the dielectric paths.

The Clemens et al. and Mindel styli require additional deposition or chemical steps. It would therefore be advantageous to overcome the sound-beat interference problem without requiring additional processing of the stylus.

SUMMARY OF THE INVENTION

We have found an improved information storage and recovery system which comprises a playback stylus having a dielectric support element and a conductive electrode, and a grooved conductive disc record in which information is recorded. The information is recovered on playback while there is relative motion between the record surface and the stylus by sensing capacitive variations between the stylus conductive electrode and the record surface. The improvement comprises employing that angle between the electrode face and the record surface such that the respective paths of dielectric effects between the electrode face and the record surface both in the direction of relative motion and in the direction opposite the direction of relative motion are balanced.

DETAILED DESCRIPTION OF THE INVENTION

Figure 1:
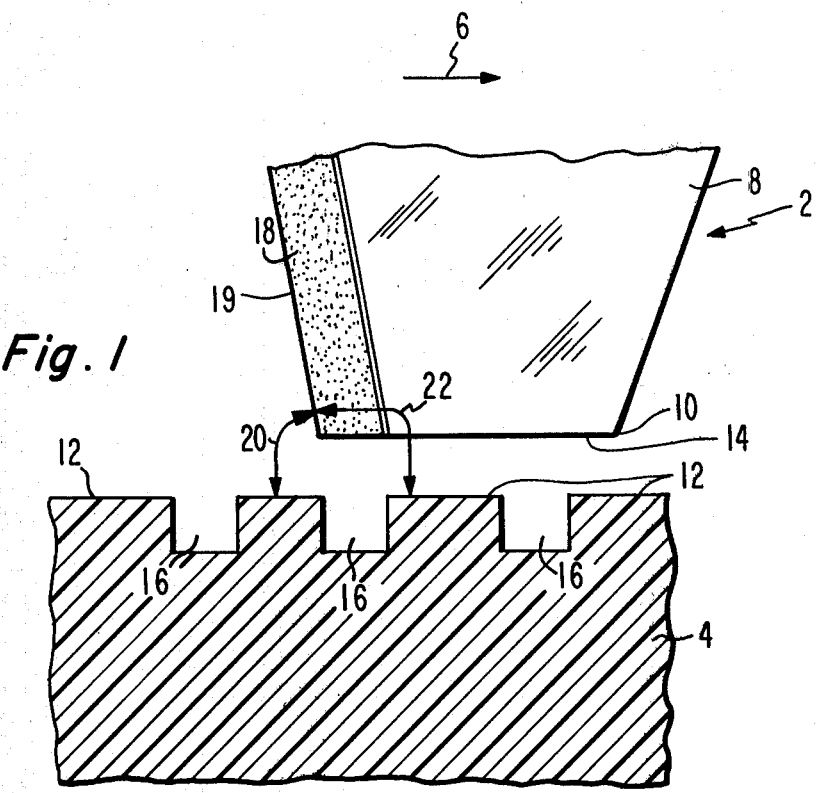
FIG. 1 is a schematic view of a first stylus recovering information from a capacitive video disc record.

This invention may be illustrated by means of the drawing. FIG. 1 is a schematic drawing of a first stylus 2 recovering information from a capacitive video disc record 4. The direction of relative motion between the stylus 2 and the capacitive video disc record 4 is shown by the arrow 6.

The first stylus 2 includes a dielectric support element 8 which is generally fabricated out of a hard, crystalline material such as diamond or sapphire. The prow 10 is in the front of the stylus 2 and therefore first contacts the capacitive video disc record 4 top surface 12 when the stylus 2 and the capacitive video disc record are in relative motion. The first stylus 2, its bottom surface 14 (sometimes referred to as the stylus shoe), and the capacitive video disc record top surface 12 are generally separated by a lubricant layer, not shown. The lubricant may be a polysiloxane which may be applied by evaporation, spraying or other convenient methods.

The audio and video information is recorded in the capacitive video disc record top surface 12 as a series of pits 16. As the first stylus 2 and the capacitive video record top surface 12 approach each other, the segments of the information recorded in the surface of the record are sensed by the stylus electrode 18 as capacitive variations. The stylus electrode 18 senses recorded information pits 16 directly under its bottom surface 14, or approaching or moving away from the stylus electrode 18.

It is believed that when the angle between the stylus electrode face 19 and disc record surface 12 is 90 degrees, the stylus electrode 18 more strongly senses the approaching recorded information than the receding information. As a result the waveform sensed by the electrode is skewed. The asymmetric dielectric constants enhance the asymmetric dielectric paths to cause this skewed signal and this is a cause of the sound-beat distortion of the video information.

In order to correct this problem it has been found that altering the electrode angle to the record surface so that it is other than 90 degrees overcomes the distortion and minimizes the sound-beat problem. The electrode orientation should be such as to balance the dielectric paths on both sides of the stylus electrode 18—capacitive video disc record top surface 12 path. The angle which the electrode face 19 makes with the record surface 12 can be empirically determined. Generally the first angle 20 which the electrode face 19 makes with the record surface 12 is less than 90 degrees, while the second angle 22 which the electrode face 19 makes with the record surface 12 is greater than 90 degrees. This arrangement is due to the dielectric constants of air and/or the lubricant and the dielectric support material 8. In first stylus 2, the dielectric support element 8 face whereon stylus electrode 18 is prepared is lapped so that first angle 20 is less than 90°. An equivalent result could be obtained by lapping the stylus bottom surface 14 to produce the desired first angle 20.

Figure 2:
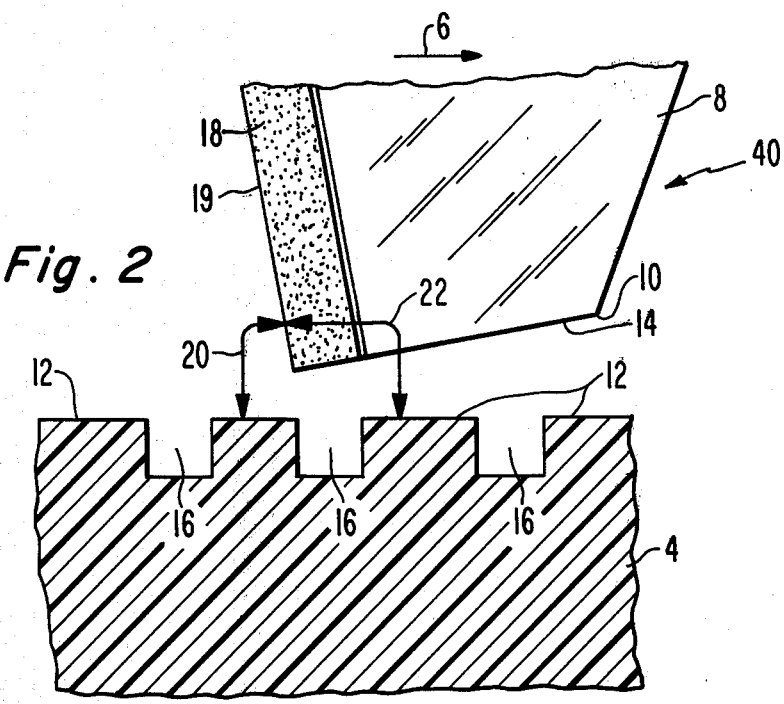
FIG. 2 is a schematic view of a second stylus recovering information from a capacitive video disc record.

Alternatively a stylus may be tilted to produce the desired first angle 20 as shown for second stylus 40 in FIG. 2. The angle between the electrode face 19 and the stylus bottom surface 14 is about 90°, but the second stylus 40 has been tilted such that the first angle 20 is less than 90°. When the second stylus 40 is tilted more lubricant will be under the raised foreward portion so that the first angle 20 will be smaller than in FIG. 1 when the dielectric paths are balanced.

Factors other than minimizing sound-beat must also be considered. If the first angle 20 is too small, then the stylus electrode 18 only senses part of the approaching signal, which causes a decrease in picture quality. Furthermore, the electrode 18 not only senses the approaching recorded information but also senses considerable amounts of the receding information, thereby skewing the waveform and causing distortion. The electrode face must therefore be oriented so as to balance the fore and aft fringing capacitance dielectric paths with the effect on picture quality caused by using a first angle 20 of less than 90 degrees. It is clear, thus, according to this invention, that the paths of dielectric effects are balanced but the distance of those paths are not balanced.

The present invention will be further illustrated by means of the following example. However, it is to be understood that the invention is not meant to be limited to the details contained therein.

EXAMPLE

A test audio signal was recorded in a conductive vinyl video disc. A keel tipped stylus described by Keizer, U.S. Pat. No. 4,162,510, was employed. The bottom surface of the stylus was lapped so that it conformed to the record groove geometry. The dielectric support element was diamond. The electrode face was coated with about 2,000 angstroms of titanium.

The first angle 20 was varied by tilting the stylus as shown in FIG. 2. The sound-beat was measured with respect to a reference signal. The more the measured signal was below the reference signal, the smaller was the sound-beat. The results are shown in the table below.

TABLE

| First Angle 20 (Degrees) | No. of Styli Tested | Sound-Beat (Decibels) |
| --- | --- | --- |
| 75 | 7 | −36 |
| 85 | 5 | −30 |
| 90 | 5 | −23 |

The results indicate that sound-beat is reduced as the first angle 20 decreases.

I claim:

1. In an information storage and recovery system which comprises a playback stylus, having a dielectric support element and a conductive electrode, and a grooved conductive record disc, in which information is recorded, wherein the information is recovered on playback while there is relative motion between the record surface and the stylus by sensing capacitive variations between the stylus conductive electrode and the record surface;

wherein the improvement comprises employing that angle between the electrode face and the record surface such that the respective paths of dielectric effects between the electrode face and the record surface in the direction of relative motion and in the direction opposite the direction of relative motion are balanced.

2. An information storage and recovery system in accordance with claim 1 wherein the dielectric support element is diamond.

3. An information storage and recovery system in accordance with claim 1 or claim 2 wherein the playback stylus is keel-tipped.

4. A method for diminishing the sound beat in the video portion of a signal recovered by a grooved capacitive information storage and recovery system comprising a record disc, in which information is recorded, and a playback stylus, having a dielectric support element having a conductive electrode and a shoe which engages the record disc, which comprises the steps of:

rotating the record disc so that there is relative motion between the record surface and the playback stylus, employing that angle between the conductive electrode face and the conductive record disc surface such that the respective paths of dielectric effects between the electrode face and the record disc surface both in the direction of relative motion and in the direction opposite the direction of relative motion are balanced, and sensing capacitive variations between the stylus conductive electrode and the record surface.

5. A method in accordance with claim 4 wherein the dielectric effect paths are balanced by lapping a dielectric support element face so that the desired angle between the conductive electrode face and the stylus shoe is obtained.

6. A method in accordance with claim 4 wherein the angle employed to balance the dielectric effect paths is obtained by tilting the stylus.

7. A method in accordance with claim 4 wherein the dielectric effect paths are balanced by lapping the stylus shoe so that the desired angle between the conductive electrode face and the stylus shoe is obtained.

* * * * *